US011943519B2

(12) United States Patent
Arimatsu et al.

(10) Patent No.: US 11,943,519 B2
(45) Date of Patent: Mar. 26, 2024

(54) INFORMATION PROCESSING DEVICE, INFORMATION PROCESSING METHOD, AND PROGRAM (71) Applicant: SONY INTERACTIVE ENTERTAINMENT INC., Tokyo (JP)

(72) Inventors: Kazuyuki Arimatsu, Tokyo (JP); Hideki Mori, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 225 days.

(21) Appl. No.: 17/617,728

(22) PCT Filed: Jul. 1, 2019

(86) PCT No.: PCT/JP2019/026183
§ 371 (c)(1),
(2) Date: Dec. 9, 2021

(87) PCT Pub. No.: WO2021/001911
PCT Pub. Date: Jan. 7, 2021

(65) Prior Publication Data
US 2022/0294935 A1 Sep. 15, 2022

(51) Int. Cl.
H04N 23/50 (2023.01)
G06F 3/044 (2006.01)

(52) U.S. Cl.
CPC ............. H04N 23/50 (2023.01); G06F 3/044 (2013.01)

(58) Field of Classification Search
CPC .......... H04N 23/50; G06F 3/044; G06F 3/014
See application file for complete search history.

(56) References Cited

U.S. PATENT DOCUMENTS 8,937,609 B2 * 1/2015 Yoshida ................ G06F 3/044
345/174
10,126,820 B1 * 11/2018 Chang ..................... G06F 3/017
(Continued)

FOREIGN PATENT DOCUMENTS

JP H10-113343 A 5/1998
JP H11-513157 A 11/1999

OTHER PUBLICATIONS

International Search Report and Written Opinion dated Aug. 13, 2019, from PCT/JP2019/026183, 9 sheets.

*Primary Examiner* — Chiawei Chen
(74) *Attorney, Agent, or Firm* — XSENSUS LLP (57) ABSTRACT Provided is an information processing device coupled to a device which a user operates with a hand of the user and on the surface of which a plurality of sensors that each output information associated with a spatial positional relation with the surface of the hand of the user are arranged, the information processing device being configured to receive output from each of the sensors included in the device and generate an image in which an image element having been drawn with a pixel value determined on the basis of a value represented by the output from each of the sensors is arranged at a position corresponding to a position at which each of the sensors is arranged, on a mapping space obtained by plane-unfolding a portion that constitutes the surface of the device and on which the sensors are arranged, Further, the information processing device is configured to, upon receipt of input of the generated image, estimate information associated with the position of each of joints of the hand of the user who operates the device and output the estimated information as coordinate information in a three-dimensional space whose origin is placed on a point that moves with the device.

6 Claims, 4 Drawing Sheets (56) References Cited

U.S. PATENT DOCUMENTS

| | | | |
|---|---|---|---|
| 10,705,606 B1* | 7/2020 | Colonnese | G06T 7/20 |
| 11,379,037 B2* | 7/2022 | Lin | A63F 13/214 |
| 2009/0048539 A1* | 2/2009 | Lundborg | A61F 2/70 |
| | | | 600/595 |
| 2011/0306421 A1* | 12/2011 | Nishimoto | G06F 3/0482 |
| | | | 345/660 |
| 2017/0031503 A1* | 2/2017 | Rosenberg | G06F 3/045 |
| 2020/0159319 A1* | 5/2020 | Lin | A63F 13/24 |
| 2020/0201460 A1* | 6/2020 | Erivantcev | G06F 3/017 |
| 2020/0286302 A1* | 9/2020 | Lee | G06F 3/017 |
| 2020/0372716 A1* | 11/2020 | Murata | G06F 3/0304 |
| 2021/0271340 A1* | 9/2021 | Moscarillo | G06F 21/83 |

\* cited by examiner

INFORMATION PROCESSING DEVICE, INFORMATION PROCESSING METHOD, AND PROGRAM

TECHNICAL FIELD

The present invention relates to an information processing device, an information processing method, and a program.

BACKGROUND ART

Nowadays, a technology for detecting actual movements of a hand and fingers of a user and reflecting them in movements of an object existing in a virtual space is being developed.

For such processing, as one of devices for detecting the hand, conventionally, there has been a device that detects whether each of fingers of a hand of a user is being bent or is being stretched by imaging the hand with a camera or the like and recognizing a shape of the hand with use of an apparatus having machine-learned the relation between an image obtained from the imaging operation and the shape of the hand.

SUMMARY

Technical Problem

Meanwhile, for a game controller or the like that a user grasps and operates with his or her hand, there is a technology for acquiring information representing a spatial positional relation with the hand of the user by using each of sensors arranged on the surface of the game controller. In this technology, the sensors are arranged along the surface shape of the housing of the game controller, and the acquired information represents a spatial positional relation acquired directly from each of the sensors. For this reason, the nature of the acquired information is significantly different from the nature of information associated with such an image obtained by the imaging operation from a single point in a space, and it is an actual situation that, in such a technology, even though the above-described conventional technology for recognizing a shape of the hand is applied, sufficient accuracy cannot be acquired and it is difficult to estimate a shape of the hand.

The present invention has been made in view of the above-described actual situation, and an object of the present invention is to provide an information processing device, an information processing method, and a program that are capable of, based on the results of detection by sensors arranged on a device that a user operates with a hand of the user, estimating a shape of the hand.

Solution to Problem

An aspect of the present invention to solve the above-described problem in the conventional example is an information processing device coupled to a device that a user operates with a hand of the user and on the surface of which a plurality of sensors that each output information associated with a spatial positional relation with the surface of the hand of the user are arranged, the information processing device including means that receives the output from each of the sensors included in the device, means that generates an image in which an image element having been drawn with a pixel value determined on the basis of a value represented by the output from each of the sensors is arranged at a position corresponding to a position at which each of the sensors is arranged, on a mapping space obtained by plane-unfolding at least a portion that constitutes the surface of the device and on which the sensors are arranged, and means that, upon receipt of input of the generated image, estimates information associated with the position of each of joints of the hand of the user who operates the device and that outputs the estimated information as coordinate information in a three-dimensional space whose origin is placed on a point that moves with the device.

Advantageous Effect of Invention

The present invention enables a shape of a hand of a user who operates a device with the hand to be estimated on the basis of the results of detection by sensors arranged on the device.

DESCRIPTION OF EMBODIMENT

An embodiment of the present invention will be described referring to the drawings. An information processing system 1 according to this embodiment of the present invention includes an information processing device 10 and a controller device 30 as an example of a device that a user operates with his or her hand.

Figure 1:
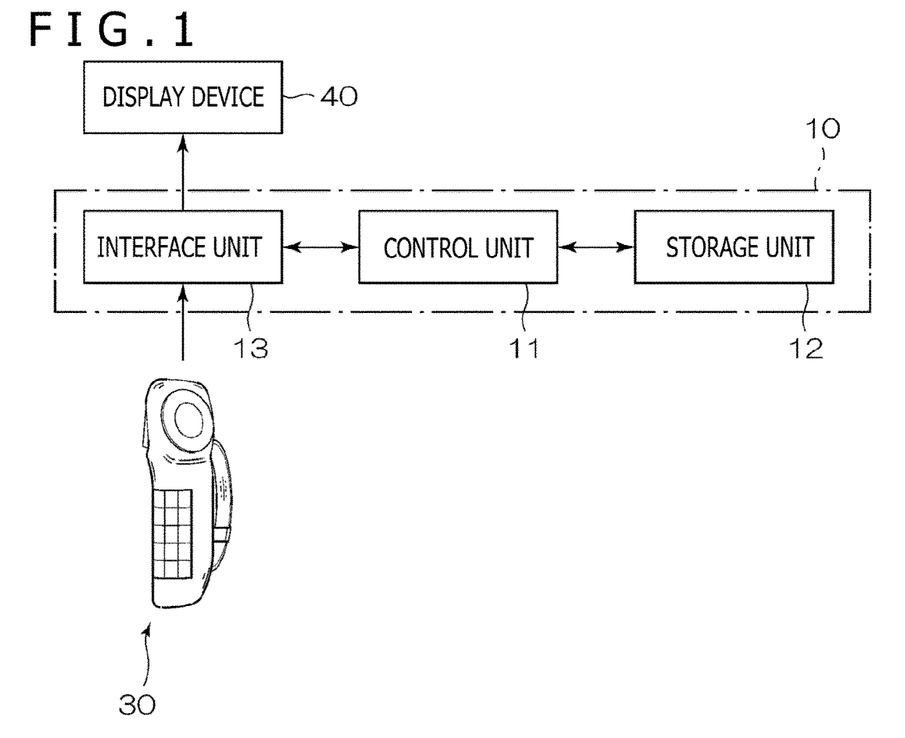
FIG. 1 is a block diagram illustrating a configuration example of an information processing system including an information processing device according to an embodiment of the present invention.

Here, the information processing device 10 is coupled to the controller device 30 and a display device 40. The information processing device 10 is a device that processes information output by the controller device 30, and may be, for example, a home game machine, a mobile game machine, a personal computer, a smartphone, a tablet, or the like. Further, the information processing device 10 may be configured integrally with the controller device 30. As illustrated in FIG. 1, the information processing device 10 includes a control unit 11, a storage unit 12, and an interface unit 13.

The control unit 11 includes at least one processor such as a central processing unit (CPU), and performs various kinds of information processing by executing programs stored in the storage unit 12. Note that specific examples of the processing performed by the control unit 11 in the present embodiment will be described later. The storage unit 12 includes at least one memory device such as a random access memory (RAM), and stores the programs executed by the control unit 11 and data processed by the programs.

The interface unit 13 is an interface for data communication with the controller device 30 and the display device 40. The information processing device 10 is coupled to each of the controller device 30 and the display device 40 via the interface unit 13 by means of either a wired line or a wireless line. Specifically, the interface unit 13 transmits, to the display device 40, video data supplied by the information processing device 10. Further, the interface unit 13 outputs, to the control unit 11, information having been received from the controller device 30.

Figure 2:
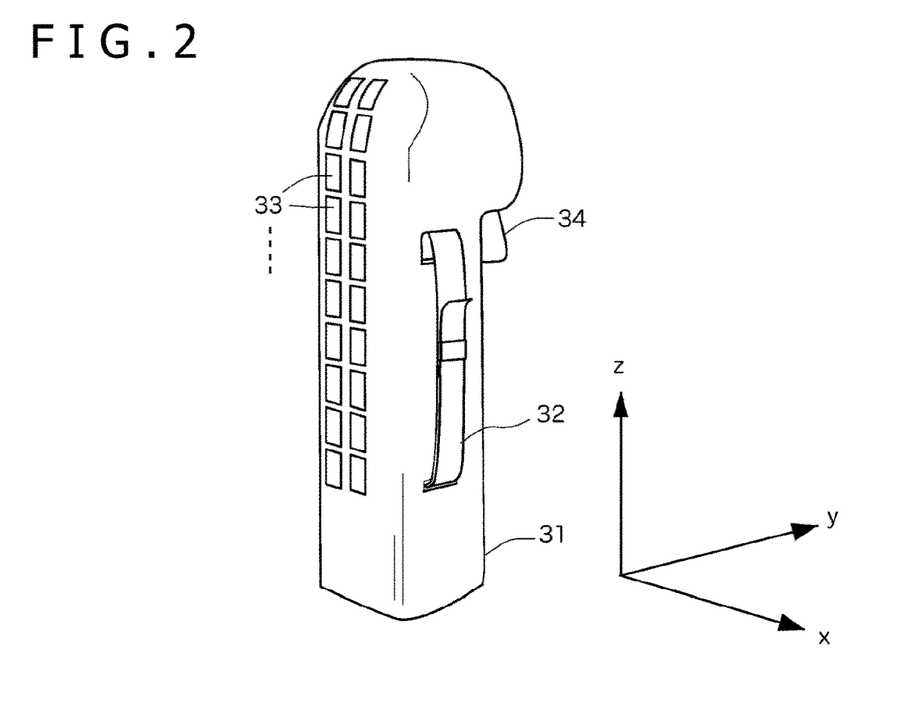
FIG. 2 is a schematic perspective view of an example of a controller device coupled to the information processing device according to the embodiment of the present invention.
Figure 3:
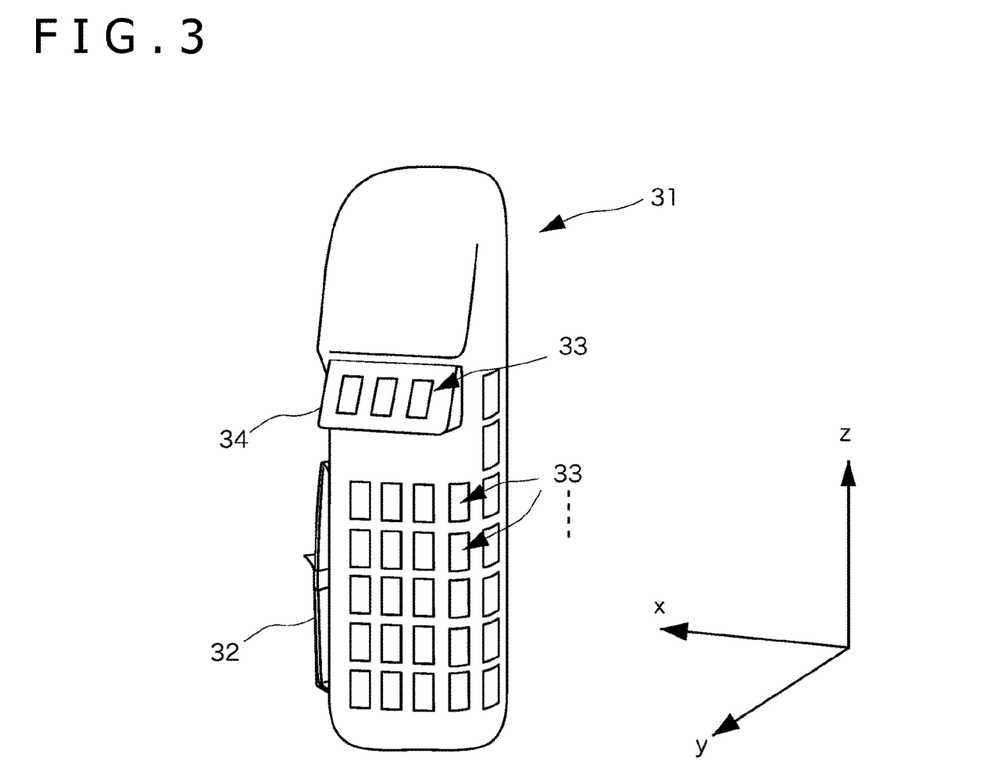
FIG. 3 is another schematic perspective view of the example of the controller device coupled to the information processing device according to the embodiment of the present invention

The controller device 30 according to an example of the present embodiment is a device that is worn on a hand of a user, as illustrated as an example in FIGS. 2 and 3, and that receives an operation by the user and outputs information associated with the operation. FIGS. 2 and 3 are schematic perspective views of the controller device 30 illustrating examples of its external views. FIG. 2 is a schematic perspective view of the controller device 30 as viewed from a side on which a thumb of a user is located when the user has grasped the controller device 30 (this side being referred to as a front side for the sake of convenience), and FIG. 3 is a schematic perspective view of the controller device 30 as viewed from a side on which fingers ranging from an index finger to a little finger of the user are located when the user has grasped the controller device 30 (this side being referred to as a back side). Note that the sizes, size ratios, arrangements, and the like of individual portions of the controller device 30 that are illustrated in FIGS. 2 and 3 are just examples, and the example of the present embodiment is not limited to the illustrated sizes, size ratios, arrangements, and the like.

In the example of FIGS. 2 and 3, the controller device 30 includes a body portion 31 and a holding fixture 32, and a user wears the controller device 30 on his or her own hand by passing the palm of his or her own hand through the holding fixture 32. Here, the holding fixture 32 may include a belt or the like that has a length adjustable to the size of the hand of the user.

On the housing surface of the body portion 31 of the controller device 30, a plurality of sensors 33 that each detect a positional relation with the hand (and fingers) of the user are arranged along the housing surface shape of the body portion 31. The examples of FIGS. 2 and 3 illustrate a state in which the plurality of sensors 33 are arranged in a matrix on the housing surface of the body portion 31. Further, the controller device 30 may include a switch/button 34 operable by, for example, an index finger, or any other finger. In this case, the sensors 33 may also be arranged on the surface of the switch/button 34.

Here, each of the sensors 33 may be a sensor, such as an infrared sensor or an electrostatic capacitance sensor, which is capable of detecting the spatial position of an object that is present within its detectable range. In the present embodiment, the information processing device 10 identifies the positions of individual joints of a hand of a user that are detection targets by using the results of the detection by the sensors 33.

Further, in the present embodiment, a hand and fingers targeted for the detection by the sensors 33 are assumed to be individual fingers of a hand on which the user wears the controller device 30. Note that, here, the user is assumed to wear the controller device 30 on any one of the hands of the user, but the user may wear mutually different controller devices 30 on both the left and right hands of the user.

The controller device 30 of the present embodiment outputs information representing the results of the detection by the sensors 33 to the information processing device 10 every predetermined timing (periodically, for example, every $1/60$ seconds, or the like).

Next, the operation of the control unit 11 of the information processing device 10 according to the present embodiment will be described. As illustrated as an example in FIG. 4, the control unit 11 of the present embodiment includes a reception unit 21, an input image generation unit 22, an estimation processing unit 23, and an output unit 24.

Figure 4:
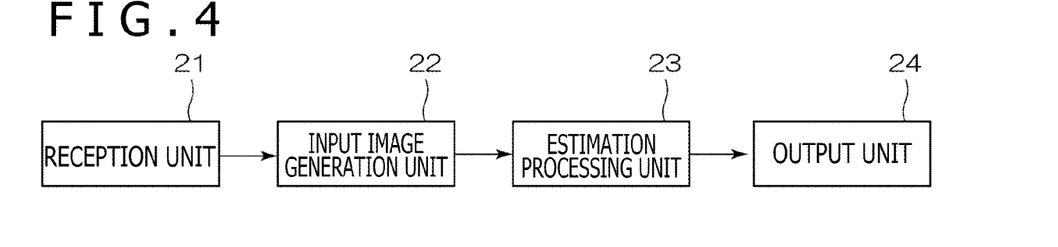
FIG. 4 is a functional block diagram illustrating an example of the information processing device according to the embodiment of the present invention.

Here, the reception unit 21 receives the information representing the results of the detection by the sensors 33 from the controller device 30. The input image generation unit 22 generates an image in which an image element having been drawn with a pixel value determined on the basis of a value represented by the result of detection by each of the sensors 33 is arranged at a position corresponding to a position at which each of the sensors 33 is arranged, on a mapping space (hereinafter referred to as an unfolded-figure space) obtained by plane-unfolding at least a portion which constitutes the housing surface of the controller device 30 and on which the sensors 33 are arranged.

Figure 5:
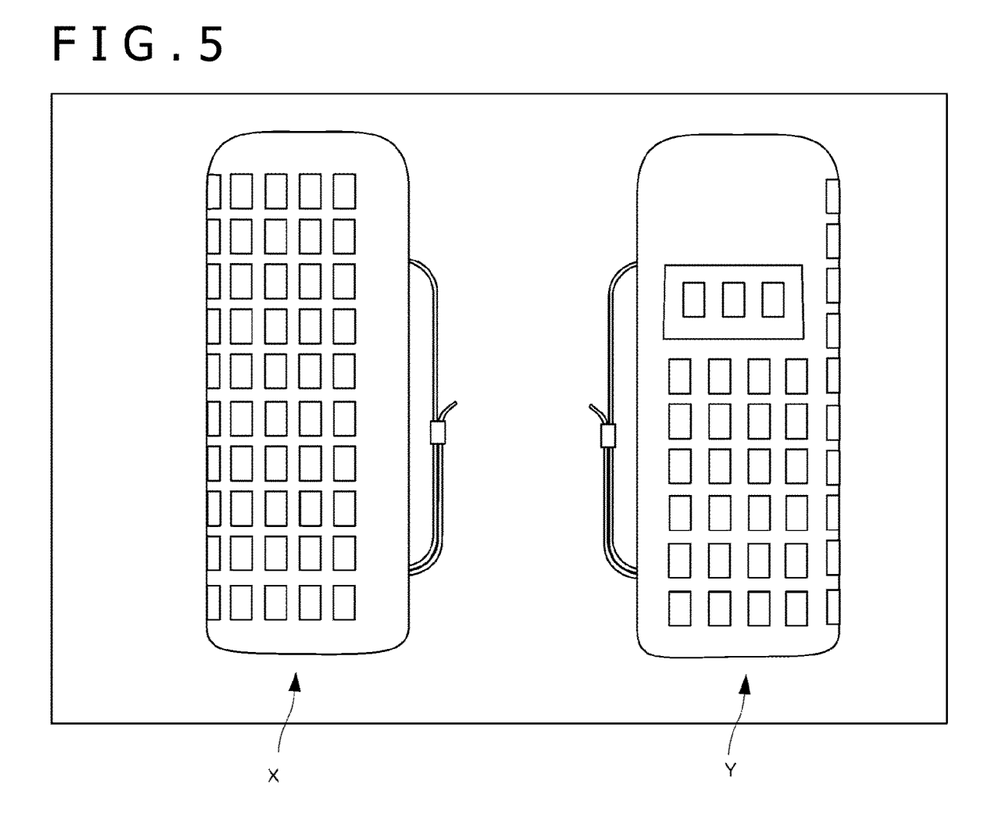
FIG. 5 is a diagram that describes an example of an unfolded-figure image generated by the information processing device according to the embodiment of the present invention.
Figure 6:
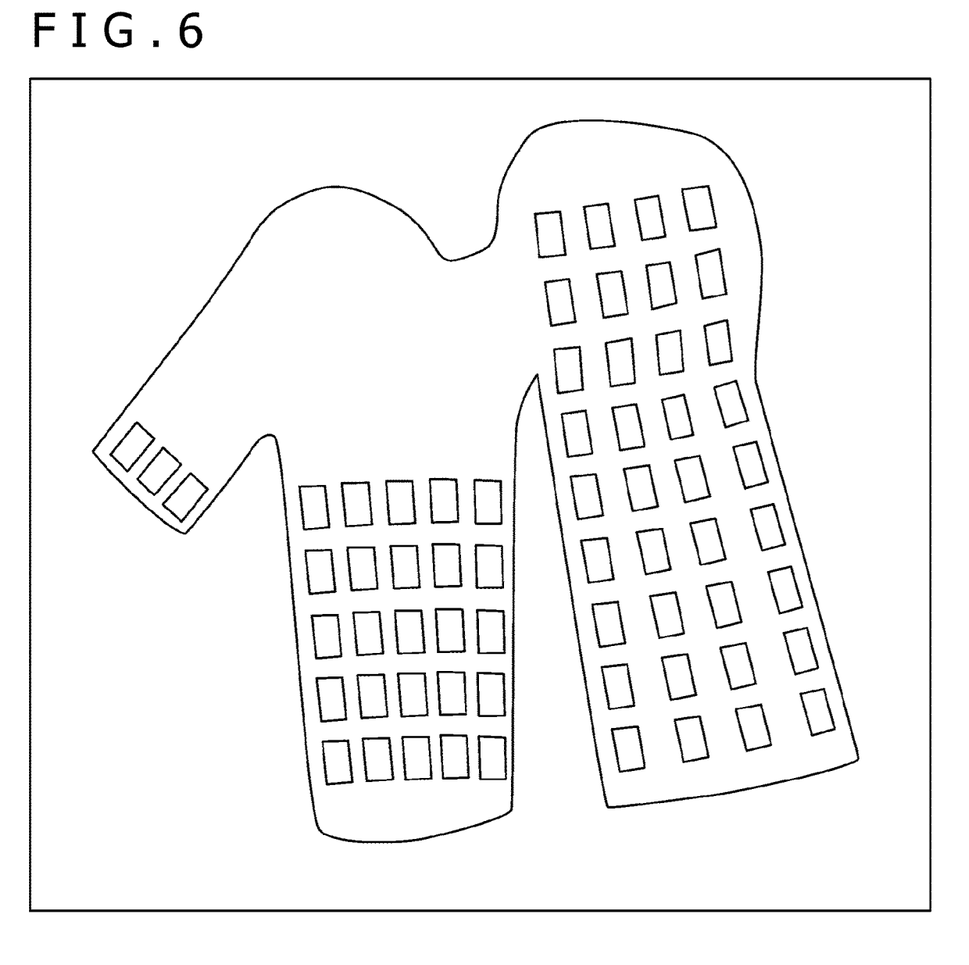
FIG. 6 is a diagram that describes another example of the unfolded-figure image generated by the information processing device according to the embodiment of the present invention.

In an example of the present embodiment, the input image generation unit 22 generates an image in which the housing surface of the controller device 30 is unfolded on a plane, as illustrated as examples in FIGS. 5 and 6. Such an image of an unfolded state may be generated in such a way that, for example, as illustrated as an example in FIG. 5, a portion X resulting from projection of the front side of the surface of the controller device 30 and a portion Y resulting from projection of the back side thereof are each arranged on a single plane.

Further, in another example, the input image generation unit 22 may generate an unfolded figure in such a way as to, as illustrated as an example in FIG. 6, make virtual seams (cuts) in the housing surface of the controller device 30. In generating such unfolded figures, various kinds of widely-known processing for creating a UV space (processing for circular-cylindrical mapping, spherical mapping, or any other kind of mapping, processing for forming virtual seams, and any other kind of processing), which are used when textures are pasted to a virtual three-dimensional object, can be employed, and thus, detailed description thereof is omitted here.

The input image generation unit 22 identifies a position corresponding to each of the sensors 33 that are arranged on the housing surface, on an acquired unfolding figure of the housing surface of the controller device 30. Further, the input image generation unit 22 generates an input image by arranging, at the specified position corresponding to each of the sensors 33, an image element having been drawn with a pixel value determined on the basis of a value represented by the result of detection by a corresponding sensor 33 (i.e., on the basis of the information having been received by the reception unit 21).

Here, the image element may be, for example, an image of a graphic having the on-unfolded figure shape of a sensor 33, or may be an image of a graphic having the shape of a rectangle or the like of a predetermined size. Further, the pixel value of the image element is, for example, a one-dimensional value such as luminance, and may be determined such that the closer a finger or a hand is located, the higher the luminance is. In this example, the image generated by the input image generation unit 22 is two-dimensional grayscale image data.

The estimation processing unit 23 receives, as input thereto, the input image having been generated by the input image generation unit 22, and performs processing for estimating information associated with the position of each of joints of a hand of a user who operates the controller device 30, by using the input image.

Specifically, the estimation processing unit 23 may make the above estimation by using a neural network having machine-learned a relation between the input image and information related to the information associated with the position of each of the joints of the hand of the user. As such a neural network, it is sufficient just to use, for example, a multi-layer neural network, and the configuration of the neural network is not particularly limited to any kind. The neural network may be, for example, a convolutional neural network (CNN; convolutional network).

Further, the neural network is machine-leaned in, for example, the following manner. In order to collect data for the learning, a user who causes the neural network to be machine-leaned, for example, pastes markers to points whose positions are to be estimated, on his or her own hand, makes various poses of the hand in a state of wearing the controller device 30 on the hand while making measurements using an apparatus that measures three-dimensional positions of the points from the positions of the markers having been imaged with a camera or the like and any other element necessary for the measurement, and acquires information representing two sets of results at a time point when each of the poses has been made, that is, the results of a corresponding one of the measurements and the results of the detection by the individual sensors 33.

Here, it is sufficient if the points whose positions are to be measured are the following two groups of twenty points in total, for example.

The first one of the two groups is as follows:
(1) Distal interphalangeal joints of fingers ranging from index finger to little finger (DIP: four points),
(2) Proximal interphalangeal joints of fingers ranging from index finger to little finger (PIP: four points),
(3) Interphalangeal joint of thumb (IP: one point),
(4) Metacarpophalangeal joints of fingers from ranging thumb to little finger (MP: five points),
(5) Carpometacarpal joints (CM: five points), and
(6) Wrist joint (Radiocarpal joint: one point).

The second one of the two groups is as follows:
(1) Tips of terminal phalanges of fingers ranging from thumb to little finger (Tips of fingers: five points),
(2) Distal interphalangeal joints of fingers ranging from index finger to little finger (DIP: four points),
(3) Proximal interphalangeal joints of fingers ranging from index finger to little finger (PIP: four points),
(4) Interphalangeal joint of thumb (IP: one point),
(5) Metacarpophalangeal joints of fingers ranging from thumb to little finger (MP: five points), and
(6) Carpometacarpal joint of thumb (CM: one point).

The above points (position estimation target points, which may include any appropriate point not corresponding to a medical joint) will hereinafter be referred to as "joints" for the sake of description.

Note that the measurement results acquired here are values represented in a world coordinate system (X, Y, Z), and thus are preliminarily converted into values in a finally acquisition-desired coordinate system. In an example of the present embodiment, the finally acquisition-desired coordinate system is defined such that a predetermined single point that moves with the controller device 30 (a predetermined on-device point such as the center of a circumscribed rectangle for the controller device 30) is defined as the origin of the coordinate system, an axis extending from the origin in a longitudinal direction of the controller device 30 is defined as a z-axis, a plane whose normal line corresponds to the z-axis is defined as an xy-plane, and in the circumscribed rectangle for the controller device 30, an axis extending in a direction of the normal line of a plane at the front side, this direction being a direction extending from the plane at the front side toward a plane at the back side, is defined as a y-axis, and an axis lying within the xy-plane and being orthogonal to the y-axis is defined as an x-axis (see FIG. 2).

In processing for a conversion from the world coordinate system, in which the measurements have been made, to the xyz coordinate system (hereinafter referred to as local coordinates), widely-known methods can be employed, and thus, detailed description of the processing for the conversion is omitted here. Further, for the purpose of the conversion, a user may acquire information representing a posture of the controller device 30 (namely, information representing the position of the origin and the directions of the x-axis, the y-axis, and the z-axis) together with coordinate information regarding the above individual points of the hand of the user.

A computer that performs machine-learning of the neural network used by the estimation processing unit 23 of the information processing device 10 (the computer may be the information processing device 10 itself) acquires sets of two kinds of information, each of the sets being acquired, in such a way as described above, at a time point when a corresponding one of the plurality of poses has been made, one of the two kinds of information being information representing the position of each of the joints of the hand of the user in the local coordinates, the other one thereof being the results of the detection by the individual sensors 33.

Further, the computer performs the following processing while sequentially selecting each of the acquired sets. That is, the computer that performs machine-learning processing generates an input image on the basis of information that represents the results of the detection by the individual sensors 33 and that is included in a selected set, by performing the same processing as that performed by the input image generation unit 22 of the information processing device 10. The computer acquires differences between two kinds of information, one of the two kinds of information being information that is output by the neural network upon input of the generated input image into the neural network (here, this information is assumed to be information of the same dimensions as those of the information representing the position of each of the joints of the hand of the user in the local coordinates (here, the dimensions being 60 dimensions=20×3 dimensions)), the other one of the two kinds of information being the information representing the position of each of the joints of the hand of the user in the local coordinates, this information being included in the selected set. Further, the computer controls weights among individual layers of the neural network on the basis of the acquired differences. This control is known as what is called backpropagation processing, and thus, the description thereof is omitted here.

The computer sequentially updates the weights among the individual layers of the neural network by the above processing to thereby perform the machine-learning of the neural network such that the neural network outputs the result of estimation of the position of each of the joints of the hand of the user on the basis of the abovementioned input image.

Note that, here, described is an example in which machine learning is performed so as to allow the neural network to directly estimate the information representing the position of each of the joints of the hand of the user in the local coordinates, but the present embodiment is not limited to this example. For example, the machine leaning may be performed so as to allow the neural network to, in the same space as that of the input image (the two-dimensional space obtained by unfolding the housing surface of the controller device 30, that is, the unfolded-figure space in the present embodiment), estimate both a point (a closest proximity point) that lies on the housing surface of the controller device 30 and is closest to the position of each of the abovementioned joints in distance within a three-dimensional space and a distance from the closest proximity point to the each of the joints. In this case, the output of the neural network is information for each of the joints of the hand of the user, this information including both a heatmap image representing a probability that each of points in the space of the abovementioned unfolded figure becomes a closest proximity point of a corresponding joint and a distance from a face on the space of the unfolded figure (namely, the surface of the controller device 30) to the corresponding joint.

The estimation processing unit 23 according to the present embodiment that uses the neural network having been machine-learned in such a way as described above inputs, to the neural network having been machine-leaned, the input image generated by the input image generation unit 22 on the basis of the information that the reception unit 21 has received from the controller device 30. Further, the estimation processing unit 23 acquires the output of the neural network.

Here, in the case where the neural network directly estimates, on the basis of the input image, the information representing the position of each of the joints of the hand of the user in the local coordinates, the estimation processing unit 23 outputs the output of the neural network to the output unit 24 as it is.

Further, in the case where the neural network estimates, on the basis of the input image and for each of the joints of the hand of the user, information representing both a closest proximity point that lies on the unfolded-figure space (the same space as that of the input image) and that is closest to each of the joints and a distance from the surface of the controller device 30 to each of the joints, the estimation processing unit 23 acquires, from the above two kinds of information, information representing the position of each of the joints of the hand of the user in the local coordinates by making a coordinate conversion.

Specifically, in this example, the estimation processing unit 23 acquires the result of estimation of a closest proximity point for each of the joints by means of statistical processing or the like by using a heatmap image having been acquired for each of the joints. For example, the estimation processing unit 23 acquires an estimated value of the closest proximity point by calculating a weighted average of a probability that each of points that are represented by the heatmap image and that lie on the two-dimensional space obtained by unfolding the housing surface of the controller device 30 becomes the closest proximity point (the weighted average being calculated by multiplying, for each of the points, the probability by coordinate values thereof, calculating the sum of a resultant value of the multiplication for each of the points, and dividing the sum by the number of the points). Alternatively, the estimation processing unit 23 may determine a point whose probability of being the closest proximity point is maximum from among the individual points represented by the heatmap image, as the result of estimation of the closest proximity point.

Next, the estimation processing unit 23 acquires values in the local coordinates of the controller device 30 with respect to the closest proximity point having been estimated for each of the joints, and acquires values of a vector representing the direction of a normal line that extends from the housing surface of the controller device 30 and is located at a position lying on the housing surface and represented by the acquired values in the local coordinates. The values of the vector may be approximately calculated in the following manner. That is, the estimation processing unit 23 sets, in a virtual manner, a cylindrical column having a center line passing through the origin of the local coordinates and extending in a direction parallel to the z-axis, acquires an intersection point R that is a point of intersection of the cylindrical column with a line segment interconnecting a point Q lying in the local coordinates and corresponding to a closest proximity point at which a target normal line is to be acquired and a point P lying on the centerline and being located closest to the point Q and that is located on a side closer to the point Q, and may determine a normal line vector of the cylindrical column at the intersection point R (a vector with its start point located at the point P and its end point located at the point R), as an acquisition target vector V(Q).

Further, in the case where the shape of the housing surface of the controller device 30 is represented by a three-dimensional graphic model such as a mesh model, the estimation processing unit 23 may determine a normal line vector of the graphic model at the point Q lying in the local coordinates and corresponding to the closest proximity point at which a target normal line is to be acquired, as the acquisition target vector V(Q).

The estimation processing unit 23 acquires, for each joint i=1, 2, ... 20, coordinate information Xi representing the position of the joint i on the local coordinate system by, according to the following formula, multiplying a unit vector vi parallel to a vector V(Qi) having been acquired, in such a way as described above, from a point Qi (i=1, 2, ... 20) lying in the local coordinates and corresponding to a closest proximity point of the joint by a distance ri that is a distance up to the corresponding joint i and that is output by the neural network and adding a resultant value of the multiplication to a value of the point Qi.

$$Xi = Qi + ri \cdot vi$$

Here, any one of X, Q, and v is a three-dimensional quantity representing coordinate values.

The output unit 24 provides, to processing for an application program or any other kind of processing, the above coordinate information in the local coordinate system that has been acquired by the estimation processing unit 23 and that is associated with each of the joints of the hand of the user who operates the controller device 30.

For example, in processing for a game application program that the information processing device 10 is executing, the information processing device 10 receives, from the output unit 24, the coordinate information associated with each of the joints of the hand of the user in the local coordinate system, and performs processing for controlling the actions of characters and any other kind of processing on the basis of the coordinate information. Note that, in the case where the information processing device 10 is configured integrally with the controller device 30, instead of the execution of the game application program or the like by the information processing device 10, the information processing device 10 may transmit, to a different information processing device that is executing the game application program or the like, the coordinate information associated with each of the joints of the hand of the user in the local coordinate system, and the different information processing device may perform processing for various kinds of applications such as processing for controlling the actions of characters by using the coordinate information associated with each of the joints of the hand of the user in the local coordinate system and received from the information processing device 10 that is configured integrally with the controller device 30.

[Operation]

The information processing system 1 according to the embodiment of the present invention basically includes the above configuration, and operates in the following manner.

When a user makes actions of clenching and unclenching his or her hand in a state of wearing the controller device 30 on his or her hand, each of the plurality of sensors 33 arranged on the housing surface of the controller device 30 detects the spatial position of a partial surface constituting the surface of the hand of the user and falling within a detection range of the each of the sensors 33. Further, the controller device 30 outputs the result of the detection by each of the sensors 33.

The information processing device 10 is assumed to preliminarily retain information for configuring a machine-leaned neural network (this information including information for identifying a model of the neural network and information representing weights among individual layers in the identified model). Here, the neural network is assumed to be preliminarily machine-leaned so as to estimate both a heatmap image that represents a closest point (closest proximity point) of each of predetermined joints of the hand within the same unfolded-figure space as that of an input image (this unfolded-figure space being a two-dimensional space obtained by unfolding the housing surface of the controller device 30) and a distance from the closest proximity point to each of the joints. Note that the joints of the hand are assumed to correspond to the abovementioned twenty points.

The information processing device 10 receives the results of detection by the sensors 33 from the controller device 30, and generates an input image in which an image element having been drawn with a pixel value determined on the basis of the value of the result of detection by each of the sensors 33 is arranged at a position corresponding to a position at which each of the sensors 33 is arranged, on a mapping space obtained by plane-unfolding the housing surface of the controller device 30.

Further, the information processing device 10 inputs the generated input image into a machine-learning completed neural network, and acquires, for each of the joints of the hand of the user, an estimated result including information representing both a heatmap image representing a probability that each of points on an unfolded-figure space (the same space as that of the input image) becomes a closest proximity point of the each of the joints and a distance from the surface of the controller device 30 to each of the joints.

The information processing device 10 acquires, for each joint i (i=1, 2, . . . 20), a closest proximity point Ni by using the acquired heatmap and calculating a weighted average of a probability represented by the heatmap image, that is, a probability that each of points on the two-dimensional space obtained by unfolding the housing surface of the controller device 30 becomes a closest proximity point (the weighted average being calculated by multiplying, for each of the points, the probability by coordinate values thereof, calculating the sum of a resultant value of the multiplication for each of the points, and dividing the sum by the number of the points).

Further, the information processing device 10 converts the coordinates of the closest proximity point Ni having been estimated for each joint i (i=1, 2, . . . 20) (the above coordinates being coordinates in the coordinate system of the unfolded figure) into values represented by local coordinates of the controller device 30. Specifically, the information processing device 10 acquires a vector (normal line vector $V(Q_i)$) representing the direction of a normal line that extends from the housing surface of the controller device 30 and that is located at a point $Q_i$ lying on the housing surface and corresponding to the closest proximity point Ni. Here, information regarding a three-dimensional graphic model representing the shape of the housing surface of the controller device 30 is assumed to be preliminarily retained and the normal line vector $V(Q_i)$ at the point $Q_i$ lying on the housing surface of the controller device 30 and corresponding to the above closest proximity point Ni is assumed to be acquired on the basis of the information regarding the three-dimensional graphic model.

The information processing device 10 acquires, for each joint i=1, 2, . . . 20, coordinate information $X_i$ representing the position of the joint i on the local coordinate system by, according to the following formula, multiplying a unit vector $v_i$ parallel to the vector $V(Q_i)$ having been acquired, in such a way as described, from the point $Q_i$ (i=1, 2, . . . 20) lying in the local coordinates and corresponding to the closest proximity point of the each joint by a distance $r_i$ that is a distance up to the corresponding joint i and that is output by the neural network, and adding a resultant value of the multiplication to a value of the point $Q_i$.

$$X_i = Q_i + r_i \cdot v_i$$

Further, the information processing device 10 uses the coordinate information $X_i$ (i=1, 2, . . . 20) in the local coordinate system, which has been acquired here and which is associated with each of the joints of the hand of the user, and performs processing for an application program, such as processing for controlling the actions of characters in a game application.

In such a way as described above, the present embodiment enables a shape of a hand of a user who operates a device with the hand to be estimated on the basis of the results of detection by sensors arranged on the device.

REFERENCE SIGNS LIST

1: Information processing system
10: Information processing device
11: Control unit
12: Storage unit
13: Interface unit
21: Reception unit
22: Input image generation unit
23: Estimation processing unit
24: Output unit
30: Controller device
31: Body portion
32: Holding fixture
33: Sensor
34: Button
40: Display device

The invention claimed is:

1. An information processing device coupled to a device that is operated by a user with a hand of the user and on a surface of which a plurality of sensors that each output information associated with a spatial positional relation with a surface of the hand of the user are arranged, the information processing device comprising:
processing circuitry configured to
receive the output from each of the sensors included in the device;
generate an image in which an image element having been drawn with a pixel value determined on a basis of a value represented by the output from each of the sensors is arranged at a position corresponding to a position at which each of the sensors is arranged, on a mapping space obtained by plane-unfolding at least a portion that constitutes the surface of the device and on which the sensors are arranged; and
upon receipt of input of the generated image, estimate information associated with a position of each of joints of the hand of the user who operates the device and that outputs the estimated information as coordinate information in a three-dimensional space whose origin is placed on a point that moves with the device,
wherein the processing circuitry for estimating the information associated with a position of each of the joints is further configured to use a result of machine learning that, in a same space as a space of the input image, estimates a position closest to each of the joints of the hand of the user who operates the device and a distance from the position to each of the joints.

2. The information processing device according to claim 1, wherein the processing circuitry for estimating the information associated with the position of each of the joints is further configured to
use a result of the estimation made by using the result of the machine learning, and
convert the estimated information into coordinate information in the three-dimensional space whose origin is placed on the point that moves with the device, and output the coordinate information.

3. The information processing device according to claim 1, wherein the processing circuitry is further configured to
estimate the information associated with the position of each of the joints of the hand of the user who operates the device, by using a result of machine learning having machine-learned a relation between the input image and the information associated with the position of each of the joints of the hand of the user who operates the device, and
output the estimated information as coordinate information in the three-dimensional space whose origin is placed on the point that moves with the device.

4. The information processing device according to claim 1, wherein the sensors arranged on the device are electrostatic capacitance sensors, and the received output from each of the sensors is a result of detection by each of the electrostatic capacitance sensors.

5. A control method for an information processing device coupled to a device that is operated by a user with a hand of the user and on a surface of which a plurality of sensors that each output information associated with a spatial positional relation with a surface of the hand of the user are arranged, the control method comprising:
by the information processing device,
receiving the output from each of the sensors included in the device;
generating an image in which an image element having been drawn with a pixel value determined on a basis of a value represented by the output from each of the sensors is arranged at a position corresponding to a position at which the each of the sensors is arranged, on a mapping space obtained by plane-unfolding at least a portion that constitutes the surface of the device and on which the sensors are arranged; and
estimating, upon receipt of input of the generated image, information associated with a position of each of joints of the hand of the user who operates the device and outputting the estimated information as coordinate information in a three-dimensional space whose origin is placed on a point that moves with the device,
wherein the processing circuitry for estimating the information associated with a position of each of the joints is further configured to use a result of machine learning that, in a same space as a space of the input image, estimates a position closest to each of the joints of the hand of the user who operates the device and a distance from the position to each of the joints.

6. A non-transitory computer-readable storage medium storing computer-readable instructions thereon which, when executed for a computer coupled to a device that is operated by a user with a hand of the user and on a surface of which a plurality of sensors that each output information associated with a spatial positional relation with a surface of the hand of the user are arranged, performs a method, the method comprising:
receiving the output from each of the sensors included in the device;
generating an image in which an image element having been drawn with a pixel value determined on a basis of a value represented by the output from each of the sensors is arranged at a position corresponding to a position at which the each of the sensors is arranged, on a mapping space obtained by plane-unfolding at least a portion that constitutes the surface of the device and on which the sensors are arranged; and
estimating, upon receipt of input of the generated image, information associated with a position of each of joints of the hand of the user who operates the device and outputting the estimated information as coordinate information in a three-dimensional space whose origin is placed on a point that moves with the device,
wherein the processing circuitry for estimating the information associated with a position of each of the joints is further configured to use a result of machine learning that, in a same space as a space of the input image, estimates a position closest to each of the joints of the hand of the user who operates the device and a distance from the position to each of the joints.

* * * * *